July 16, 1957  G. A. LYON  2,799,538
WHEEL COVER
Filed March 3, 1953
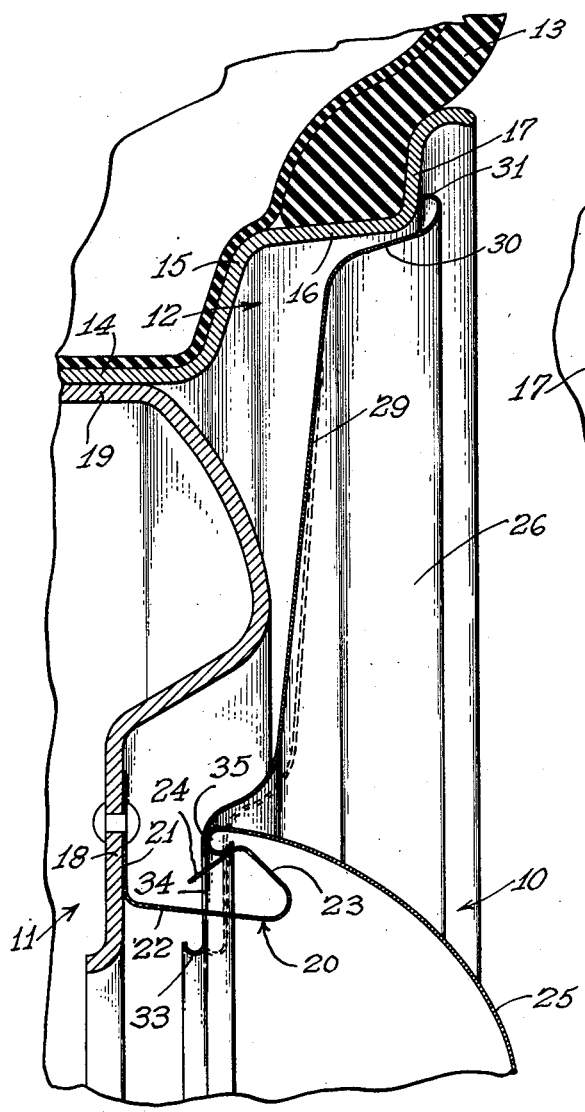
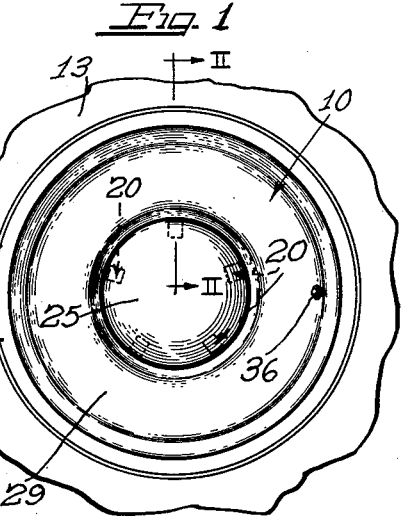
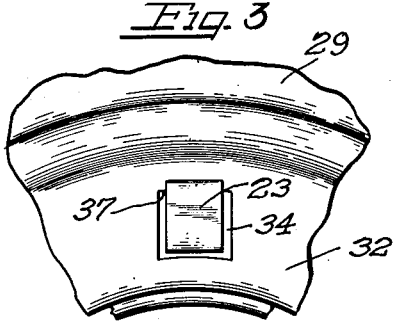
Inventor
GEORGE ALBERT LYON United States Patent Office 2,799,538
Patented July 16, 1957

2,799,538
WHEEL COVER
George Albert Lyon, Detroit, Mich.
Application March 3, 1953, Serial No. 339,976
4 Claims. (Cl. 301—37)

The instant invention relates to improvements in wheel structures and more particularly concerns the provision of ornamental and protective covering at the outermost sides of vehicle wheels.

An important object of the present invention is to provide a wheel structure including a novel cover for the outer side of the wheel.

Another object of the invention is to provide a wheel structure having a cover thereon and including novel means for retaining the cover on the wheel.

Yet another object of the invention is to provide an improved composite vehicle wheel cover.

In accordance with the general features of the present invention, there is provided a multi-flange tire rim supported by a wheel body inset substantially relative to a generally axially outwardly facing shoulder on the tire rim and having a central bolt-on flange with a plurality of axially outwardly extending cover retaining spring clips thereon having cover retaining resilient heads providing generally axially inwardly facing retaining shoulders spaced a substantial distance from the bolt-on flange, with a cover assembly for the outer side of the wheel including an annular cover plate member having radially inner and outer marginal portions and an intermediate axially resiliently flexible portion, said radially outer marginal portion comprising an annular substantially rigid reinforced edge structure engageable with said rim shoulder and thereby supporting the annular cover member in axial position on the wheel with said inner marginal portion and the intermediate portion spaced substantially from the wheel body but with the inner marginal portion located behind the clip shoulders and spaced substantially clear of the bolt-on flange, and a central hub cap cover member having a reinforced turned edge structure engageable retainingly with said clip shoulders and interposed between the latter and the cover member inner margin and thereby pressing against the inner margin of the annular cover member and thrusting the same axially inwardly away from the shoulders in the space between the shoulders and the bolt-on flange and flexing said intermediate portion axially inwardly to place the annular cover member under resilient tension whereby the outer annular portion presses firmly against said rim shoulder while the inner marginal portion provides substantial axially outward resilient tensioned thrust against said turned hub cap edge structure to maintain the same in resilient tensioned rattle-free thrusting engagement with the clip shoulders, said annular cover intermediate and inner marginal portions remaining at all times entirely clear of the wheel body in the assembled relationship of the cover members on the wheel.

Other objects, features and advantages of the present invention will be readily apparent from the following detailed description of a preferred embodiment thereof taken in conjunction with the accompanying drawings in which:

Figure 1 is an outer side elevational view of a wheel structure embodying the features of the present invention;

Figure 2 is an enlarged fragmentary radial sectional view taken substantially on the line II—II of Figure 1; and Figure 3 is an enlarged fragmentary outer side elevational view of the wheel structure in the initial assembly of one of the cover members thereon.

A cover assembly 10 embodying the features of the invention is adapted to be applied to the outer side of a vehicle wheel including a wheel body 11 and a tire rim 12, the latter being of the multi-flanged drop center type adapted for supporting a pneumatic tire and tube assembly 13.

The tire rim 12 comprises a base flange 14 and a side flange 15 extending generally radially and outwardly from the base flange. Directed generally axially outwardly from the side flange is an intermediate flange 16 which merges with a terminal flange 17.

The wheel body 11 is preferably of the disk spider type comprising a stamping made from a suitable heavy gauge sheet metal and having a central bolt-on flange 18 and a peripheral attachment flange 19 secured to the base flange of the tire rim. On the bolt-on flange 18 is mounted a plurality of generally gooseneck retaining clips 20 each having a base flange 21, extending radially inwardly, an axially outwardly extending resilient arm 22 joined to the radial inner end of the flange 21, and a resilient gooseneck head portion 23 comprising a cam flange directed radially outwardly and axially inwardly from the outer end of the arm 22 and terminating in a retaining shoulder flange portion 24 extending radially inwardly and axially inwardly.

According to the present invention, the wheel cover 10 comprises a composite structure adapted to be held by means of the clips 20 in resilient tensioned contact against the wheel structure with sufficient force to avoid flutter or rattle of the cover. To this end, the cover assembly 10 comprises a central crown or hub cap member 25 and an annular ring cover member 26. The crown member 25 is dimensioned to overlie the central portion of the wheel body and the inner marginal portion of the annular ring 26. The ring 26 is dimensioned to substantially overlie the tire rim 12 and to underlie the outer marginal portion of the crown member 25.

In a preferred form, the annular cover member 26 is disposed in spaced relation to the wheel body, with the outer peripheral edge portion of the annular member constructed to bear against the rim flange 17. For this purpose, the ring member is provided with a generally straight radially outwardly extending and slightly axially outwardly extending body portion 29 which merges into a radially outwardly and axially outwardly inclined reinforcing rib-like outer marginal portion 30 having an underturned finishing bead or flange 31 in engagement with the tire rim flange 17.

At its inner periphery, the ring body 29 merges along a transverse ogee curve into a radially inwardly directed reinforcing inner marginal attachment flange 32 (see Fig. 3) which is in inset relation to the ring body 29 and axially outwardly spaced from the wheel body 11. For reinforcing purposes, the inner end of the inset flange 32 is provided with an underturned bead-like flange 33.

For attaching the ring 26 on the wheel, the marginal attachment flange 32 of the ring member is provided with a series of rectangular apertures 34 which are respectively disposed in registry with the spring clips 20 attached to the body of the wheel.

In the initial assembly of the annular ring member 26 of the cover to the wheel proper, the ring member is first centered with relation to the wheel so that the valve stem of the tire assembly 13 will pass through a valve stem opening 36, provided for this purpose in the ring body 29, and the apertures in the ring are in alignment with the wheel body clips 20. The ring member is then pressed in an axially inward direction to cam the retaining head portions 23 of the clips radially inwardly to enable them to pass through their respective apertures 34; and, in this instance, allow the clips to snap into engagement with the radially outer edge of the apertures and thereby resiliently urge the ring cover member 26 into contact with the rim flange 17. In this manner, the retaining flange 24 of the clip engages an outer edge 37 of the aperture to resiliently retain the ring member in the position shown in dotted outline in Fig. 2.

It will be observed that in order to facilitate positioning and centering of the ring relative to the wheel without requiring excessive tolerances, each aperture has a width slightly greater than the width of the clip. In this way, the annular ring is easily centered and disposed in supporting relation with the retaining clips 20 to lie in spaced relation to the wheel body as shown in dotted outline in Fig. 2.

The central crown portion or hub cap cover member 25 of the cover is comprised of a concave-convex disk type stamping made from a suitable thin gauge sheet metal, such as stainless steel or brass or the like. The crown is disposed with its concave surface facing axially inwardly and terminates in an inturned reinforcing and finishing flange bead 35 which is adapted to seat against the offset flange 32 adjacent its juncture with the body 29 of the ring member.

In the final assembly of the wheel cover on the wheel, the crown cover member 25 is centered relative to the wheel and pushed into snapping engagement with the clips 20. In riding over the cam flange 23 of the clip, the peripheral bead 35 of the crown member 25 forces the inner marginal flange in an axially inward direction, out of engagement with the retaining flange 24 of the clip, so as to flex and place the ring member 26 under tension substantially as indicated, from the dash outline to the solid outline in Fig. 2. The retaining flange 24 flexibly holds the bead 35 against the inner marginal flange of the ring cover and prevents the bead from backslipping over the head portion 23 of the gooseneck clip.

It is to be noted, that in this particular instance, relative turning of the ring cover member 26 with respect to the wheel is minimized and shearing off of the valve stem is avoided due to the opposition of the spring clips passing through the ring.

The retaining clips may be arranged in any spaced pattern, five being shown in Fig. 1, but a larger or smaller number may be used if desired.

For affording convenient means for prying the crown member 25 from its seated position against the inner marginal attachment flange 32 of the ring cover member 26, the marginal flange 32 is joined to the ring body 29 by a rib-like juncture providing an annular pry-off shoulder concentrically spaced from the crown cover member 25 and having a diameter slightly greater than the diameter of the crown cover member.

It may also be noted that by virtue of the inset relation of the inner marginal portion 32 of the cover member 26 and the pry-off shoulder arrangement generally radially spaced about the hub cap bead 35, the pry-off shoulder also provides a confining shoulder to maintain the hub cap in substantially centered relation against radial forces thereon.

Also, it will be noted that inasmuch as the radially outer marginal portion 30 of the cover member 26 is generally telescoped into the axially extending intermediate rim flange 16, the marginal portion 30 is engageable with the rim flange incident to unusual radial forces on the cover to thereby avoid undue diametrical displacement of the cover assembly relative to the wheel which might overstress the retaining clips 20.

It will be understood that modifications and variations may be effected without departing from the scope of the novel concepts of the present invention.

I claim as my invention:

1. In a wheel structure including a multi-flange tire rim supported by a wheel body inset substantially relative to a generally axially outwardly facing shoulder on the tire rim and having a central bolt-on flange with a plurality of axially outwardly extending cover retaining spring clips thereon having cover retaining resilient heads providing generally axially inwardly facing retaining shoulders spaced a substantial distance from the bolt-on flange, a cover assembly for the outer side of the wheel including an annular cover plate member having radially inner and outer marginal portions and an intermediate axially resiliently flexible portion, said radially outer marginal portion comprising an annular substantially rigid reinforced edge structure engageable with said rim shoulder and thereby supporting the annular cover member in axial position on the wheel with said inner marginal portion and the intermediate portion spaced substantially from the wheel body but with the inner marginal portion located behind the clip shoulders and spaced substantially clear of the bolt-on flange, and a central hub cap cover member having a reinforced turned edge structure engageable retainingly with said clip shoulders and interposed between the latter and the cover member inner margin and thereby pressing against the inner margin of the annular cover member and thrusting the same axially inwardly away from the shoulders in the space between the shoulders and the bolt-on flange and flexing said intermediate portion axially inwardly to place the annular cover member under resilient tension whereby the outer annular portion presses firmly against said rim shoulder while the inner marginal portion provides substantial axially outward resilient tensioned thrust against said turned hub cap edge structure to maintain the same in resilient tensioned rattle-free thrusting engagement with the clip shoulders, said annular cover intermediate and inner marginal portions remaining at all times entirely clear of the wheel body in the assembled relationship of the cover members on the wheel.

2. A wheel structure as defined in claim 1 wherein the tire rim has a generally axially extending flange disposed radially inwardly and axially inwardly adjacent to said rim shoulder, and the radially outer marginal portion of the annular cover member has a generally axially inwardly extending marginal portion telescoped into said axially extending rim flange and in normally radially inwardly spaced relation thereto, with said telescoped marginal portion engageable with the rim flange incident to unusual radial forces on the cover to thereby avoid undue diametrical displacement of the cover relative to the wheel which might overstress the retaining clips.

3. In a wheel structure according to claim 1, the radially inner marginal portion of the annular cover member being inset relative to the intermediate portion and toward the bolt-on flange of the wheel body and providing in normally radially spaced relation to said hub cap turned edge structure a confining shoulder to maintain the hub cap in substantially centered relation against radial forces thereon and also serving as a pry-off shoulder structure against which a pry-off tool is adapted to be levered in detaching the hub cap from the clip shoulders.

4. In a wheel structure as defined in claim 1, the radially outer marginal portion of the annular cover member having a generally axially extending and radially outwardly facing shoulder structure serving as a centering and diametric displacement preventing means in association with a normally radially spaced opposing flange portion of the tire rim, and the inner marginal portion of the annular cover member being axially inwardly inset and providing about the turned margin of the hub cap a centering and pry-off shoulder structure.

References Cited in the file of this patent

UNITED STATES PATENTS

| | | |
|---|---|---|
| 2,162,732 | Lyon | June 20, 1939 |
| 2,166,216 | Lyon | July 18, 1939 |
| 2,368,240 | Lyon | Jan. 30, 1945 |
| 2,386,227 | Lyon | Oct. 9, 1945 |
| 2,401,492 | Lyon | June 4, 1946 |

FOREIGN PATENTS

| | | |
|---|---|---|
| 475,083 | Canada | July 10, 1951 |